United States Patent [19]

Bartow et al.

[11] Patent Number: 4,862,265
[45] Date of Patent: Aug. 29, 1989

[54] CRT DEVICE LIGHT VERSUS INPUT SIGNAL CHARACTERISTIC FUNCTION

[75] Inventors: Richard E. Bartow, Macedon; William K. Darrow, Webster; Wayne T. Hartmann, Brockport, all of N.Y.

[73] Assignee: Eastman Kodak Company, Rochester, N.Y.

[21] Appl. No.: 239,246

[22] Filed: Sep. 1, 1988

[51] Int. Cl.$^4$ .............................................. H04N 17/04
[52] U.S. Cl. .................................... 358/139; 358/164; 358/903
[58] Field of Search .................... 358/139, 10, 32, 164, 358/243, 903, 242, 243, 29; 324/404; 356/121; 371/20, 25, 26, 27; 340/703

[56] References Cited

U.S. PATENT DOCUMENTS 4,386,345  5/1983  Narveson et al. .............. 340/732 X Primary Examiner—James J. Groody
Assistant Examiner—Victor R. Kostak
Attorney, Agent, or Firm—Edward Dugas

[57] ABSTRACT

The present invention is a system and a method for measuring and then predicting the light output from a cathode ray tube device as a function of the input signal to the device. An input signal series is selected and a table is formed indicating the light output level for each signal input level. Parameters of a characteristic equation are then determined by a regression and an automatic or manual optimization process. The optimum values of these parameters (units-converter constant, gain, offset, and gamma) are then used to predict the light output from the measured device.

4 Claims, 4 Drawing Sheets

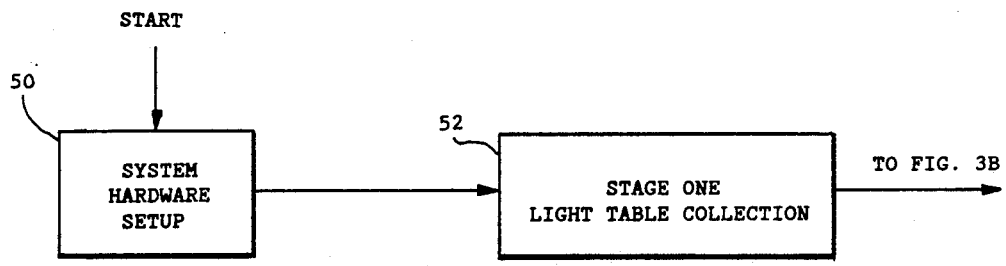

- READY COMPONENTS
  - SIGNAL GENERATOR
  - CRT DEVICE
  - LIGHT METER (LM)
  - LM PROBE RIGID ATTACHMENT
- TEST INTERFACE AND CONTROLS

- SELECT OPTIONS
  - CONFIGURATION MODE NUMBER
    1. HOST (18) OR INDUSTRY STANDARD (12) GENERATOR TO RGB (14) DEVICE
    2. HOST (18) THROUGH ENCODER (22) TO STANDARD (20) DEVICE
    3. HOST (18) SINGLE CHANNEL (LIKE GREEN) OR INDUSTRY STANDARD (12) GENERATOR TO STANDARD (20) DEVICE
  - PREPARE VIDEO-INPUT (VIN) SERIES
    - SPECIFY SERIES (LINEAR, LOG, OR SPECIFIC)
    - SPECIFY SIGNAL UNITS
      - DAC FOR DIGITAL (0 TO 255)
      - IRE (0 TO 100)
    - ALL CHANNELS (R,G,B)
  - RECTANGLE SIZE AND POSITION
  - MANUAL/AUTO SIGNAL GENERATOR CONTROL
  - MANUAL/AUTO LIGHT METER READING
- PREFORM COLLECTION
  - INITIALIZE LIGHT TABLE DATA FILE
  - PROCESS CONTROL OF LIGHT VERSUS SIGNAL READINGS BY RANDOM SELECTION
  - FOR AUTOMATIC OPERATIONS AND FOR EACH NEW LIGHT-PER-SIGNAL POINT
    - TAKE NUMBER-OF-READINGS SPECIFIED
    - WAIT SPECIFIED READING-DELAY TIME
    - ALLOW ANOTHER NUMBER-OF-READINGS WHEN CV>MINIMUM FOR ANY SIGNAL (CV IS COEFFICIENT-OF-VARIATION)
  - STORE VALUES IN LIGHT TABLE DATA FILE
    - FOR EACH SIGNAL LEVEL
      - TRUNCATED LIGHT VALUES
      - LOG LIGHT VALUES
      - CV
      - VIN
    - GENERAL OPERATION CONTROLS
      - WAIT TIME (READING-DELAY TIME)
      - NUMBER-OF-READS PER LIGHT

FIG. 3a

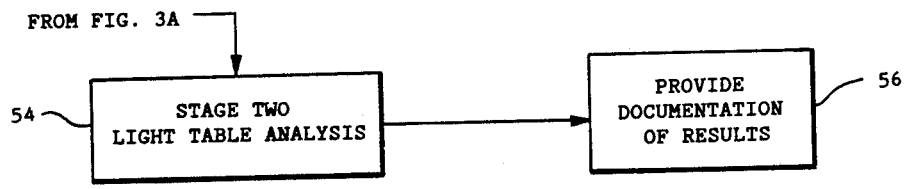

- SELECT
  - DATA SOURCE
    - PREVIOUSLY SAVED FILE
    - MANUALLY INPUT
  - CHANNELS TO ANALYZE (R,G,B,ALL)
  - REGRESSION LIMITS
  - BACKSUBSTITUTION LIMITS
  - MINIMIZATION MODE
    - MGMO-MINIMIZE GAIN THEN OFFSET
    - MOMG-MINIMIZE OFFSET THEN GAIN
    - HGMO-HOLD GAIN, MINIMIZE OFFSET
  - RECTANGLE SIZE AND POSITION
    AS STAGE ONE (DOCUMENTATION)
- OPERATION
  - VDR (VIDEO DRIVE) SERIES
    - EQUATIONS
      VIN (VIDEO-INPUT)
      - SAME AS STAGE ONE (INTEGRITY)
      - CALCULATE VIN PER CONFIGURATION
        MODE
        - VIN UNCHANGED FOR MODE 1 AND 2
        - FOR MODE 3
          VIN = 255(VIN-19.125)/235.875
      VDRDAC = VIN (GAIN) + OFFSET
      VDRIRE = VDRDAC (100) / 255
    - EITHER DAC OR IRE USED IN
      REGRESSION
  - MANUAL OPTIMIZATION
    - ACCEPT A GAIN AND OFFSET TO
      TRIAL
    - LEAST-SQUARES REGRESSION TO
      DETERMINE GAMMA ($\gamma$) AND
      CONSTANT (K)
    - BACK SUBSTITUTION TO DETERMINE
      A NEW-SUM OF PD'S
  - AUTOMATIC OPTIMIZATION
    - ACCEPT SEEDS (GAIN, OFFSET,
      EPSILON)
    - ITERATE UNTIL
      [|NS-OS|>EPSILON AND NS>OS]
  - REPORT PERTINENT DATA TO THE
    OPERATOR AND ANY OPTIMIZATION
    RESULT TO THE PRINTER AS A FINAL
    DOCUMENT
  - APPENDIX A CONTAINS THE STAGE TWO
    PROGRAM TMGMA

- PARAMETERS
  K,G,O,$\gamma$ FOR EACH CHANNEL
- RESIDUALS: SUM OR PERCENT
  DIFFERENCES BETWEEN MEASURED
  AND PREDICTED LIGHT VALUES
- APPENDIX E CONTAINS AN EXAMPLE
  OF A REPRESENTATIVE DOCUMENT NOTES:
1. HERE ALL DAC SIGNALS ARE BASED
   ON 8 BITS
2. HERE IRE IS A VIDEO SIGNAL UNIT
   USED IN THE BROADCAST INDUSTRY

FIG. 3b

CRT DEVICE LIGHT VERSUS INPUT SIGNAL CHARACTERISTIC FUNCTION

TECHNICAL FIELD OF THE INVENTION

The present invention relates to a system and a method for measuring the light from a cathode ray tube device as a function of the input signal to that device.

BACKGROUND OF THE INVENTION

A portion of the disclosure of this patent document contains material to which a claim of copy right protection is made. The copyright owner has no objection to the facsimile reproduction of any one of the patent documents or the patent disclosure, as it appears in the U.S. Patent and Trademark Office patent file or records, but reserves all other rights whatsoever.

CRT devices particularly of the multi-phosphor gun type require a number of settings for variables such as white balance (R, G, B screen controls), black balance (R, G, B bias controls), contrast and black level (brightness) which ultimately determine the CRT's light response to an input signal. In U.S. Pat. No. 3,962,722 entitled "Color Television Setup Apparatus and Method" by W. S. Ciciora there is disclosed a factory production-line system for the adjustment of controls on television receivers to obtain consistent CRT output. Test patterns are displayed on the CRT screen and are measured by photosensitive devices at the system input. The outputs of the system are connected to bidirectional motors temporarily attached to the shafts of the controls of the receiver to adjust the controls as a function of the light measurements. Prior to the aforementioned patented invention, the adjustment of the various controls was performed by an operator in response to a "go", "no-go group" of lights which received inputs from the face of the CRT. Two additional patents of interest are U.S. Pat. No. 4,700,218 entitled "Automated System for Adjustment of the White Balance in a Signal Displayed on the Screen of a Color Cathode Ray Tube", by P. N. Thomsen et al. and U.S. Pat. No. 4,706,108 entitled "Automatic Setup System for Controlling Color Gain, Hue and White Balance of TV Monitor" by T. Kumagai et al. Both of the inventions covered in the adjustment of some CRT device parameters in accordance with stored reference values. The stored values are then used to provide adjustment signals for automatically adjusting one or more of the controls associated with the CRT to bring the value of the control to some predetermined standard value.

Another patent of interest is U.S. Pat. No. 4,415,921 entitled "Automatic Calibration System for Video Displays in Vision Testing" by P. Mulvanny et al. The method of that patent relates to a procedure for calibrating a video display to obtain a desired light level in response to an input level. Of main concern is the ability to repeatably adjust to the selected values of brightness and contrast. One of the prime uses of the invention is to provide a degree of standardization to vision tests in order to provide statistically constant data that can be utilized to detect vision problems.

SUMMARY OF THE INVENTION

The present method and apparatus determines the light output from a cathode ray tube device through a characteristic equation as a function of the device input signal. Parameters of the equation are determined by a two stage process once the measurement system, CRT device and signal generator are configured. The measurement system is controlled by a computer and software program. The program directs a signal generator to output a plurality of discrete signal values. For each signal, the program records a value from a light meter. The light meter's sensor is rigidly positioned to collect the light output from the CRT at specific and repeatable CRT-screen regions. The number of signal values and their relationships are requested as a part of the program operation. The final series of monochrome or multichannel (for example red, green, and blue) signal values and light readings are placed into a light table which fulfills stage one (Light Table Collection) of the system process.

Stage two (Light Table Analysis) evaluates each parameter of the characteristic equation [see Equation (1)] in an automatic operation or by the exercise of controls that allow an operator to analyze the error surface occurring between the actual light measured and the theoretical light predicted by the characteristic equation.

FIG. 1 graphically illustrates the CRT device's characteristic equation. Note that the log-log axis shows that the gamma ($\gamma$) is associated with the slope as an exponential or power operator while the device gain G is a linear operator on the input signal. The device gain change the resolution (level-to-level discrimination) and range of the signal. The offset O starts taking control of the function when the signal gets into a low range.

The CRT device characteristic function is based on equation (1) which mathematically describes FIG. 1. Preferred value of parameters K, $\gamma$, G, and O are computed, based on a statistical regression and optimization technique. This occurs in the stage two process. The stage two process also allows trial values to be tested so that regions of minimum error, brought about by optimized values, can be fully evaluated by the operator for any satisfaction criteria desired. The CRT device's characteristic (predicted light) equation is:

$$L = K(GS + O)^{\gamma} \tag{1}$$

where
- L = phosphor-light output
- K = a specific constant which converts a specific unit of signal into a specific unit of light
- S = input signal to the device
- G = device gain
- O = device offset and
- $\gamma$ = an exponential relationship between a s drive signal and its light output.

From the foregoing, it can be seen that a primary object of the present invention is to model specific light characteristics of a CRT device as provided by signal processing circuits from the device input to the CRT and the light output characteristics of the CRT.

It is a further object of the present invention to provide a method for simulating the response of a CRT device to an input signal.

Another object of the present invention is to establish the repeatability of the measurement of the parameters of the characteristic equation.

It is another object of the present invention to provide a method and an apparatus for more accurately determining the characteristics of a cathode ray tube device in response to an input signal.

These and other objects of the present invention will become more apparent when taken in conjunction with the following description and drawings wherein like characters indicate like parts and which drawings form a part of the present specification.

BRIEF DESCRIPTION OF THE DRAWINGS

FIG. 3 is a flow chart illustrating the method of the present invention.

DESCRIPTION OF THE PREFERRED EMBODIMENT

Figure 1:
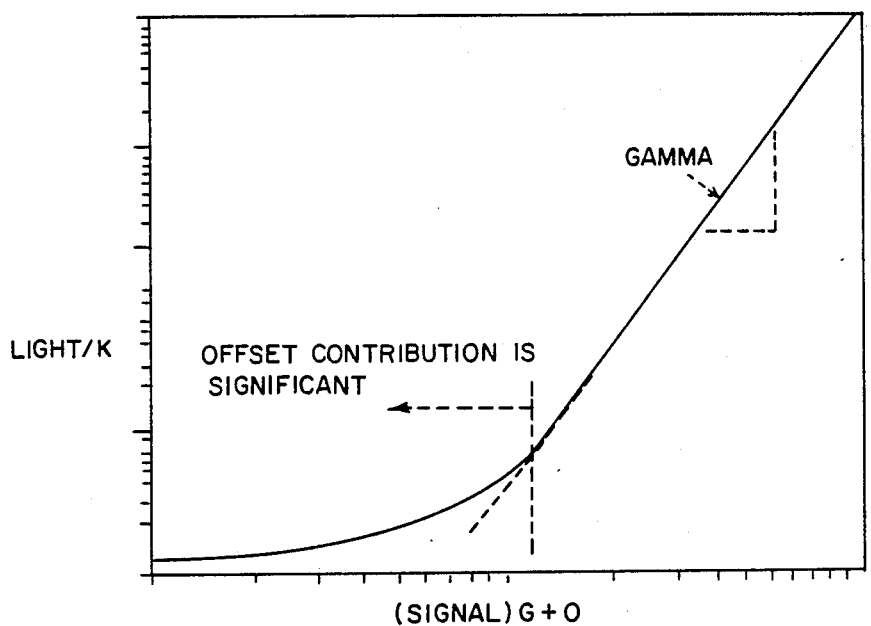
FIG. 1 is a graph illustrating the CRT device's characteristic equation.

The graph of FIG. 1 has been previously discussed under the paragraph, "Summary of the Invention".

Figure 2:
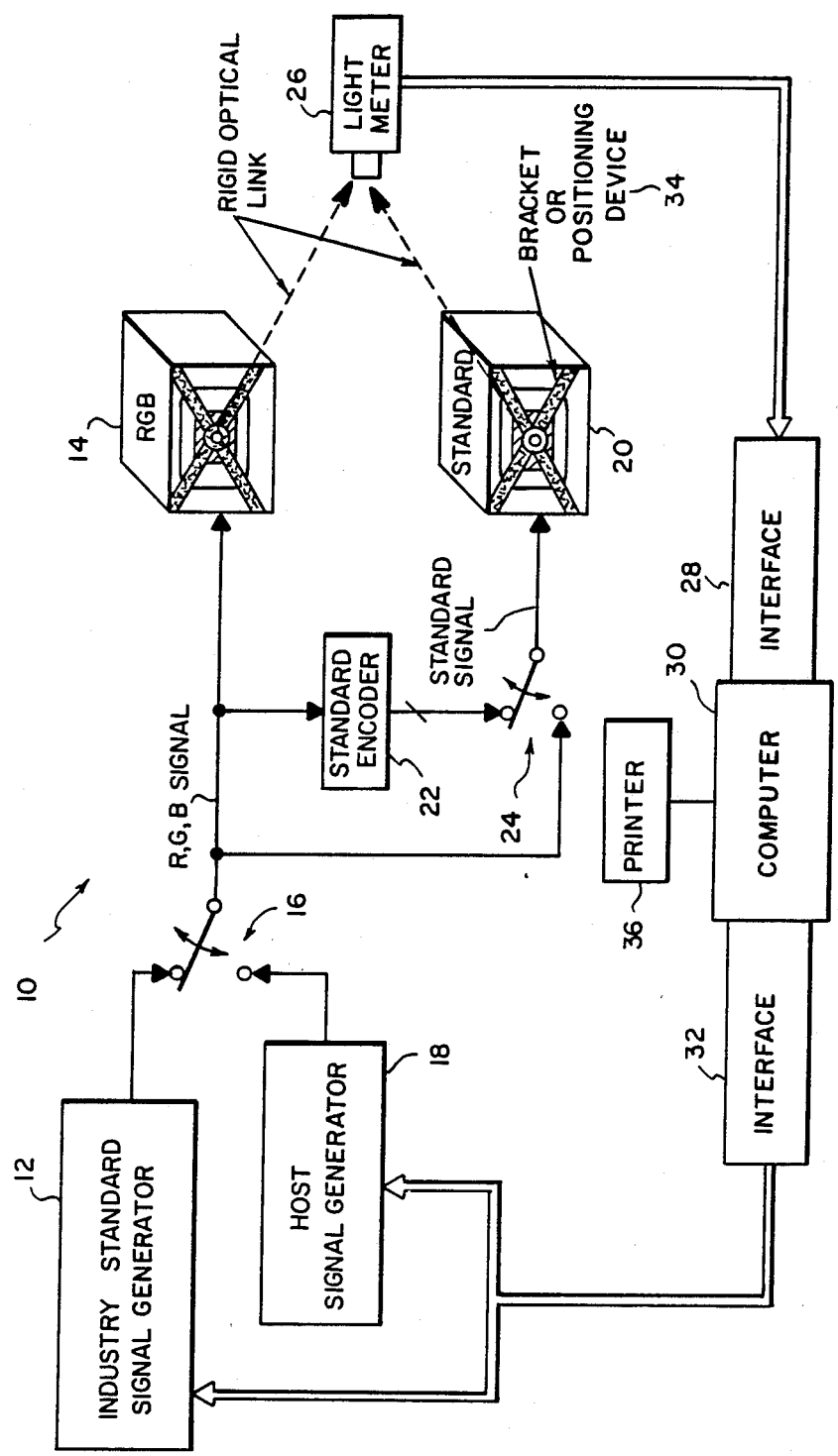
FIG. 2 is a block diagram illustrating the system of the present invention.

Referring to FIG. 2, the system 10 configuration of components incorporates two cathode ray tube (CRT) monitors 14 and 20, each having a rigid bracket or positioning device 34 for attachment and repeatable positioning of a light meter 26's sensor to the face of the tube. Once the configuration of system 10 is selected and assembled, as generally depicted in FIG. 2, it is controlled by the human operation of a computer 30. In the system 10, computer 30 is of the Digital Equipment Corporation PDP-11 family running under RSX11M. Here, system 10 provides signal generators 12 and 18 that are compatible with the CRT device or encoder. An appropriate incoder 22 outputs a signal consistent with a corresponding standard monitor 20. Switches 16 and 24 allow convenience and are for the purpose of providing paths for characterizing multiple types of CRT devices such as those shown in system 10. Under computer 30 program control, interface 32 directs the signal generator to output a specifically channeled (for example red, green, blue or gray), specifically sized and positioned video-image rectangle, and specific signal levels. Also under program control, interface 28 receives the light meter 26's measurement of light from the CRT.

A single evaluation of the characteristic function parameters is conducted with switches 16 and 24 in a set position, and with a single generator and a single monitor. Once the light table of stage one (See FIG. 3, block 52) is complete, a different or similar system 10 component configuration is important in statistical analysis of parameter values.

Industry standard generator 12 can provide a signal to standard monitor 20 via the standard encoder 22 or directly through switch 24. It should be noted that standard as used herein implies convention to a system such as NTSC, PAL, and SECAM. Generator 12, being an industry standard, permits a comparison to be made with a host signal generator under actual environmental (hardware terminations, temperature, earth's magnetic field, etc.) conditions. By operating the standard generator 12 to provide a full-field-level-selective output signal, it is possible, through proper interface to standard encoder 22, to obtain discrete monochrome (for example red, yellow and gray) signal levels for comparison to those from a host generator path through the same encoder 22.

Use of different radiance type light meters, with no other change to system 10, may poduce a change in parameters K, G and O but, theoretically, not in parameter $\gamma$. Use of different luminance type light meters should not produce a change in any parameter. However, because all of the aforementioned parameters are finally determined statistically, the uncertainty and tolerance of all system components will affect actual parameter evaluation.

Use of different signal generators may provide different units of signal control (such as volts, IRE units, digital levels corresponding to the total number of bits, etc.) These different units will affect the numerical value but not the meaning of parameters K, G and O but should not, in theory, affect the numerical evaluation of parameter $\gamma$.

Computer 30 and interfaces 32 and 28 do not directly affect the numerical evaluation of any parameter. They simply serve as convenient and time-saving system components in the operation of system 10. The purpose of the interface can also be carried out manually by a human. The computer calculations would then be carried out on any computational device capable of regression and optimization as explained in a following description which accompanies FIG. 3. In a practical application of this invention, the computer and interface automation is mandatory. In periodic applications such as maintenance and troubleshooting or other special investigations like quality analyses, the light output resulting from a specific signal channel, signal level, rectangle size, and rectangle position could be accommodated with a partially or totally manual operation of system 10.

Positioning of the light meter sensor by apparatus 34 is critical to the integrity of this invention. CRT devices are nonuniform in their light output at any tube-screen-region of active video. The optical coupling and geometry of the light meter sensor material and housing to any particular screen-region is also critical to the integrity of this invention. The uncertainty and tolerance of this mechanial aspect will bias the numerical values of the parameters but will assure the integrity of their use.

Referring now to FIG. 3 wherein the flow chart of the process, using the system 10, is depicted with four major flow steps identified by blocks 50, 52, 54 and 56. Once the operator of the system 10 satisfies all of the hardware setup conditions of block 50, the computer programs proceed to fulfill tasks as labeled in blocks 52 and 54 which in turn work to output documents as specified in block 56. Below each block of FIG. 3 is a list of the major items accomplished in each step. This format serves as a total representation of the process of system 10's operation which is to obtain the characteristic function parameters and to document all data used to obtain their values.

Block 50, hardware setup, insures that the major components of system 10 are ready to function. This step also includes a text of computer 30's interfaces to the signal generators 12 or 18, whichever is to be used, and to the light meter 26. Testing here simply means that the system 10 components provide technically reasonable results. It is to be expected that nominal values would result when all equipment is operated at the manufacturer's specified conditions. Of course, operation of the components at the borders of their specifications or in a particular condition of setup is an application of this invention for establishing criteria for troubleshooting limits (such as margin testing) or quality control limits (such as gamma or other characteristic function parameter tolerance).

Block 52 identifies stage one of the process called light stable collection. Stage one can be conducted purely manually, partially manually and partially by computer program, or completely by computer program. The method of control is entirely application dependent. For example, some applications of this invention can use signal generators with no hardware connection to computer 30. In applications of this nature, the system 10 operator must manually place the generator at a signal level and on a channel as called out by the stage one operational process. Since stage one must address many applications, it will be described herein in as general a manner as possible rather than presenting one or many similar programs or flow charts for controlling its operation. It is assumed in this writing that stage one does use a computer program and general computer peripherals. All information used in conducting stage one such as the type generator and type device, controls, and the complete light-to-signal response is recorded electronically in a coputer file for use in stage two and also as final documentation information. The types are recorded because a specific type generator with a specific type device requires a proper video drive equation for stage two's mathematical integrity.

The first task of stage one is to select the allowed options which are provided by the system 10's configuration of major components. The configuration mode number identifies the specific type of generator and device so that stage two uses the proper drive equation. In FIG. 3, three modes are defined, more are possible. The idea is to label each mode so that data is properly formulated in stage two. Another option is to select the generator's signal series and the number of channels. It is assumed that the generator and CRT device will characterize three channels identified as RGB for red, green, and blue. An industry standard generator may force specific levels as opposed to a host digital generator which would allow, for example, a logarithmic series or a series to test the linearity of a low range. FIG. 3 identifies two signal units although there can be many more. Here again, a control procedure is devised so that stage two maintains its mathematical integrity and the entire process is properly documented. The option of selecting the size and location of the video image rectangle is strictly a matter of investigating the behavior of various CRT screen regions. Along with the attachment of the light meter and its light gathering properties, the rectangle specification allows an analysis of CRT screen uniformity. As the person who serves as the system-component selector considers the operation of stage one, specific options must be allowed for reasons such as convenience, integrity, and testing. For example, two options given for testing are the number-of-readings to be taken at each light level and the reading-delay time (the time between application of the signal and the actual measurement). The minimum reading-delay time can only be determined, practically, in automatic stage one operations. Parameters which result from strict changes to one option, one value at a time, will provide troubleshooting and quality control tolerances.

Preforming the light table collection of stage one is accomplished by randomly selecting a single channel and associated signal value from the series provided and reading the light meter until all signal values and options are satisfied. In automatic operations, the coefficient of variation (CV) statistic is computed. If the CV is greater than a minimum, an optional value, the process of light collection is halted to allow a retesting of that light-versus-signal measurement. The number of significant digits which are saved for the light meter reading is a matter of light meter precision. Appendix E contains an example of a representative light table. The precision of numbers is noted.

Block 54 identifies stage two, light table analysis, of the process. Stage two is conducted by operation of a computer program which is listed in Appendix A through Appendix D and which is itemized in FIG. 3. The program, shown written in FORTRAN, allows the operator to determine optimum values for gain (G) and offset (O) in equation (1) for each channel by a manual or by an automatic mode of operation.

The program receives light-versus-signal and associated data from stage one in the form of a file. This type of inforamtion can be input manually in cases where it must be transported in written form. Program options allow the operator to specify the channels to be analyzed, the regression limits (the full series from start to end or a subset of the series), back substitution limits (full series or a subset), and type of analysis to perform (automatic or manual optimization). Also, some program setup questions are presented to maintain integrity with stage one and to finalize the documentation of the entire process such as configuration mode and video image rectangle size and position.

In the manual mode of optimization, the program requests initial (seed) gain and offset values to test. The video drive (VDR) is calculated as determined by the configuration mode (which ultimately defines VIN) and the signal units (VDRDAC or VDRIRE). A least squares regression, performed on the log measured (statistically from stage one) light versus log VDR, results in a slope [gamma ($\gamma$)] and intercept [constant (K)] used in equation (1). The values of gamma, K, gain and offset are then used to calculate theoretical (predicted) light values for each signal of the selected channel. The predicted light values and measured light values are used to form a percent difference (PD) for each signal. The sum of PDs for the selected channel, called New-Sum, is reported to the operator. The operator can repetitively enter gain and offset values until satisfied with the New-Sum value; hence, a manual mode of optimization. The operator can request full documentation of results. An example of the documentation is disclosed in Appendix E.

In the automatic mode of optimization, the program requests a seed value for gain and offset, and a comparison value (epsilon). A New-Sum, NSO, is calculated for the seed offset and gain. The first parameter, gain or offset, to be varied is incremented and another New-Sum, NS1, is calculated. The sign of the difference between the two New-Sums (NS1-NS0) is used to determine the sign of the increment which drives the New-Sum toward a minimum value. With the direction of the increment determined, the program continues in that direction by establishing an Old-Sum (OS) and by testing against epsilon and the New-Sum (NS). OS is normally established from the previous pass but, in some cases, when NS is greater than OS, it is held. If the absolute difference between OS and NS is greater than epsilon and NS is greater than OS, then the iteration is ended.

Having obtained an optimum value for the first parameter, the program would be finished with the optimization mode if it were HGMO (hold gain, minimize offset). In the two other cases, the optimized value of the first parameter and the seed value for the second parameter are used as the starting point of a final pass through the optimization process as just described. When the second parameter value is optimized, the analysis of the channel is complete. After each channel is optimized, gain and offset values are reported to the operator. As with the manual mode, the operator can request full documentation of results.

While there has been show what is considered to be the preferred embodiment of the present invention, it wil be manifest that many changes and modifications may be made therein without departing from the essential spirit of the invention. It is intended, therefore, in the annexed claims, to cover all such changes and modifications as may fall within the true scope of the invention.

Appendix A

```
C***********************************************************************
C*                   .Copyright @ EASTMAN KODAK COMPANY 1986
C*                            ALL RIGHTS RESERVED
C***********************************************************************
C*
C*         Module Name: TMGMA.FTN
C*
C***********************************************************************
C*
C*     Written by: WK Darrow          Date: 06-NOV-86
C*
C*     Modified by:                   Date:
C*
C*     Purpose:
C*           The purpose of this program is to provide a mechanicism
C*     through which a monitor's gamma can be calculated without any dependence
C*     on the availability of an attached video system.The data must have been
C*     previously collected and saved on either hard copy or in a file.
C*
C************************
C*
C*     Calling sequence:
C*
C*
C*     Arguments:
C*
C*     1.
C*
C*     2.
C*
C*     3. -
C*
C*     4.
C*
C*     5.
C*
C************************
C*
C*     ERROR CODES:
C*
C************************
C*
C*     Subroutines called:
C*
C*     GMATBL   -     Builds a table of drive signal values
C*     GMACAL   -     The gamma calculation subroutine
C*
C*
C************************
C*
C*     Files used:
C*
C*
C*
C*
```

```
C***************************
C*
C*      Taskbuild command file:(name .CMD)
C*
C*           or structure follows:
C*
C*      TKB)TMGMA/FP,TMGMA/-SP = TMGMA,GMACAL,GMATBL
C*
C*********************************************************************
C*
C*
C*

0001        PROGRAM TMGMA

0002        CHARACTER*1 ANS
0003        CHARACTER*6 NAME
0004        CHARACTER*80 COMNT

0005        INTEGER*2 IWORD(3,4),GDATA(6)
0006        INTEGER*2 HOW

0007        REAL*4 RWPSC(10,4),LWPSCT(10,4),TMPSC
0008        REAL*4 STDEV(10,4),DTABLE(10)

0009        EQUIVALENCE (NAME,GDATA)

C
0010        DATA HOW /1/
0011        DATA IREP,WAIT,KDATA/0,0.,1/
0012        DATA GDATA/'GA','MM','A ',' G','MA',0/
0013        DATA STDEV/40*0.0/
0014        DATA IWORD/'WH','IT','E ',' R','ED',' '
            1,'GR','EE','N ',' B','LU','E '/

0015   100  FORMAT(1X,A80)
0016   105  FORMAT(1X,I3,F7.1,I6)
0017   110  FORMAT(1X,10(F10.4))
0018   115  FORMAT(1X,10F10.1)

0019   150  FORMAT(1X,A80)
0020   155  FORMAT(1X,I3,F7.1,I6)
0021   160  FORMAT(1X,10(F10.4))
0022   165  FORMAT(1X,10F10.1)

c
         c........Turn error logging off for errors 63 and 82
         c
0023        CALL ERRSET(24,.TRUE.,.FALSE.,,,.FALSE.)
0024        CALL ERRSET(63,.TRUE.,.FALSE.,,,.FALSE.)
0025        CALL ERRSET(82,.TRUE.,.FALSE.,,,.FALSE.)
0026        CALL ERRSET(83,.TRUE.,.FALSE.,,,.FALSE.)
         c
         c........Find out where the data is coming from.
         c
0027   5    TYPE 10
0028   10   FORMAT(' Process a new or old DATA set ( N or O) ',$)
0029        ACCEPT 15,ANS
0030   15   FORMAT(A1)
         c
         c........Insure the response is acceptable
         c
0031        NUM = INDEX('NnOo',ANS)
0032        IF(NUM.EQ.0)GO TO 5

0033        IF(NUM.LE.2)THEN
         c
```

```
       c........OPEN the temporary file for DATA storage
       c
0034               OPEN(UNIT = 2 ,FILE = SDATA ,STATUS = 'SCRATCH')

0035               WRITE(2,100)COMNT
0036               WRITE(2,105)IREP,WAIT,KDATA
0037         ELSE
       c
       c.......OPEN old data file
       c
0038               TYPE *,' Enter old DATAset name (6 characters max)'
0039               ACCEPT 20,LEN,NAME
0040   20          FORMAT(Q,A6)
       c
       c.......Check NAME length and pad with blanks to full file name
0041               IF(LEN.LT.6)THEN
0042                  DO 25 M = LEN+1,6
0043   25               NAME(M:M) = ' '
0044               ENDIF
0045               OPEN(UNIT = 2 ,FILE = SDATA ,STATUS = 'OLD' ,ERR =5000)
0046               IOLD = 1
       c
       c.......Read the file comment,replicate count,delay between readings(Reading-Delay Time)
       c       light actual,light reading values and standard deviation for each
       c       signal level
       c
0047               READ(2,150)COMNT
0048               READ(2,155) IREP,WAIT,KDATA
0049               READ(2,160) RWPSC,LWPSCT,STDEV
0050               READ(2,165,ERR= 30) DTABLE 0051               DO 26 M = 1,4
0052               DO 26 N = 1,10
0053   26          LWPSCT( N,M ) = ALOG10(RWPSC( N,M ))

0054               GO TO 45
       c
       c.......Didn't read a drvie table -) must be old data with default structured table
       c
0055   30          CALL ERRTST(24,NERR )
0056               IF(NERR.EQ.1)THEN
0057                  CALL GMATBL(0,DTABLE)
0058               ELSE
0059                  GO TO 4900
0060               ENDIF
       c
       c.......List data set desciptor
       c
0061   45          TYPE 50
0062   50   FORMAT(/' Data set desciptor: '/)
0063               TYPE *,COMNT
0064               GO TO 1000
0065         ENDIF
       c
       c.......Manual mode. Ask operator to supply the light reading values
       c
0066         CALL GMATBL( HOW ,DTABLE)

0067         DO 812 INDX = 1,40

0068         IF(IMOD(INDX,10).EQ.0)THEN
0069           ICLR = INDX/10
0070           ISTAB1 = 10
0071         ELSE
0072           ICLR = INDX/10 + 1
0073           ISTAB1 = INDX - (ICLR-1) * 10
0074         ENDIF
```

```
              C
     0075           ICD = DTABLE(ISTAB1)
     0076           IDSTAB = ICD * 100./255. + 0.5
              C
              C........Request input of light values from terminal
              C
     0077   800    TYPE 805,ICD,IDSTAB,(IWORD(IMN,ICLR),IMN=1,3)
     0078   805    FORMAT(' ',I,' DAC ',I,' VIRE ',3A2,' WPSC ENTRY ',$)
     0079          ACCEPT *,TMPSC  !WATT/SQ.CM.
              C.......Truncate and round to .00
     0080          RWPSC(ISTAB1,ICLR) = (ANINT(TMPSC*1000.))/1000.
              C.......Insure nolog of zero
     0081          IF(RWPSC(ISTAB1,ICLR).LE.0.0)RWPSC(ISTAB1,ICLR)=.0004
              C.......Store vaues away in correct position
     0082          LWPSCT(ISTAB1,ICLR)=ALOG10(RWPSC(ISTAB1,ICLR))!SAVE NEXT ENTRY
     0083   812    CONTINUE c
              c........Save DATA in the temporary file
              c
     0084          IF(NUM.LE.2)WRITE (2,110)RWPSC,LWPSCT,STDEV c
              c........Calculate gamma
              c
     0085   1000   CALL GMACAL(IREP,WAIT,KDATA,DTABLE,LWPSCT,RWPSC,STDEV)
              c
              c........If this is a new data set,ask operator if the data should be saved
              c
     0086          IF(IOLD.EQ.0)THEN
     0087              TYPE 1100
     0088   1100       FORMAT(/' Save the DATA for later processing (Y or N)',$)
     0089              ACCEPT 1105,ANS
     0090   1105       FORMAT(A1)
              c
              c........If yes,ask for a file name, dataset descriptor then save all the data
              c
     0091              IF( ANS.EQ.'Y' .OR. ANS.EQ.'y')THEN
     0092                  TYPE 1110
     0093   1110           FORMAT(' Enter DATAset name( 6 characters max) ',$)
     0094                  ACCEPT 20,LEN,NAME
     0095                  IF(LEN.LT.6)NAME(LEN+1:6)='   '
     0096                  OPEN (UNIT = 1 ,FILE = 6DATA ,STATUS = 'NEW')
     0097                  TYPE *,' Enter DATAset descriptor (80 characters max) '
     0098                  ACCEPT 150,COMNT
     0099                  WRITE(1,150)COMNT
     0100                  WRITE(1,155)IREP,WAIT,KDATA
     0101                  WRITE (1,160)RWPSC,LWPSCT,STDEV
     0102                  WRITE (1,165)DTABLE
     0103                  CLOSE (UNIT = 1)
     0104              ENDIF
     0105          ENDIF
              c
              c........Close and delete temporary file
              c
     0106          CLOSE (UNIT = 2)
     0107          STOP
     0108   4900   STOP 'Error during data file read'
     0109   5000   STOP 'Unable to OPEN file'
     0110          END
```

PROGRAM SECTIONS

| Number | Name   | Size          |     | Attributes    |
|--------|--------|---------------|-----|---------------|
| 1      | $CODE1 | 003014        | 774 | RW,I,CON,LCL  |
| 2      | $PDATA | 001154        | 310 | RW,D,CON,LCL  |

| | | | | |
|---|---|---|---|---|
| 3 | $IDATA | 000044 | 18 | RW,D,CON,LCL |
| 4 | $VARS | 001244 | 338 | RW,D,CON,LCL |
| 5 | .STEMPS | 000004 | 2 | RW,D,CON,LCL |

VARIABLES

| Name | Type | Address | Name | Type | Address | Name | Type | Address | Name | Type | Address | Name | Type | Address |
|---|---|---|---|---|---|---|---|---|---|---|---|---|---|---|
| ANS | CHR | 4-000014 | COMNT | CHR | 4-000015 | HOW | I*2 | 4-000166 | ICD | I*2 | 4-001236 | ICLR | I*2 | 4-001232 |
| IDSTAB | I*2 | 4-001240 | IMN | I*2 | 4-001242 | INDX | I*2 | 4-001230 | IOLD | I*2 | 4-001222 | IREP | I*2 | 4-001234 |
| ISTAB1 | I*2 | 4-001234 | KDATA | I*2 | 4-001212 | LEN | I*2 | 4-001216 | M | I*2 | 4-001220 | N | I*2 | 4-001224 |
| NAME | CHR | 4-000000 | NERR | I*2 | 4-001226 | NUM | I*2 | 4-001214 | TMPSC | R*4 | 4-000670 | WAIT | R*4 | 4-001206 |

ARRAYS

| Name | Type | Address | Size | | Dimensions |
|---|---|---|---|---|---|
| DTABLE | R*4 | 4-001134 | 000050 | 20 | (10) |
| GDATA | I*2 | 4-000000 | 000014 | 6 | (6) |
| IWORD | I*2 | 4-000136 | 000030 | 12 | (3,4) |
| LXPSCT | R*4 | 4-000430 | 000240 | 80 | (10,4) |
| RWPSC | R*4 | 4-000170 | 000240 | 80 | (10,4) |
| STDEV | R*4 | 4-000674 | 000240 | 80 | (10,4) |

LABELS

| Label | Address | Label | Address | Label | Address | Label | Address | Label | Address |
|---|---|---|---|---|---|---|---|---|---|
| 5 | 1-000066 | 10' | 2-000074 | 15' | 2-000152 | 20' | 2-000156 | 25 | ** |
| 26 | ** | 30 | 1-001120 | 45 | 1-001172 | 50' | 2-000162 | 100' | 2-000000 |
| 105' | 2-000006 | 110' | 2-000020 | 115' | ** | 150' | 2-000032 | 155' | 2-000040 |
| 160' | 2-000052 | 165' | 2-000064 | 800 | ** | 805' | 2-000214 | 812 | ** |
| 1000 | 1-002124 | 1100' | 2-000262 | 1105' | 2-000344 | 1110' | 2-000350 | 4900 | 1-002760 |
| 5000 | 1-002776 | | | | | | | | |

FUNCTIONS AND SUBROUTINES REFERENCED

CLOS$  ERRSET  ERRTST  GMACAL  GMATBL  OPEN$  $ALG10  $ANINT  $INDEX

Total Space Allocated = 005504  1442

Appendix B

```
C****************************************************************
C*              Copyright @ EASTMAN KODAK COMPANY 1987
C*                       ALL RIGHTS RESERVED
C****************************************************************
C*
C*         Module Name: GMATBL.FTN
C*
C****************************************************************
C*
C*         Written by: WK Darrow        Date: 27-MAY-87
C*
C*         Modified by:                 Date:
C*
C*         Purpose:
C*              This subroutine builds the table of drive values for the
C*         gamma subroutines
C*
C*************************
C*
```

```
C*   Calling sequence: CALL GMATBL(HOW,TABLE)
C*
C*
C*   Arguments:
C*
C*     1.HOW     -     I*2     Flag to indicate build default or ask operator
C*                             defined light table
C*                             0 - ask operator ,<> 0 - use default table
C*
C*     2.TABLE   -     R*4     Ten element table of signal values at which
C*                             light readings are taken
C*
C*     3.
C*
C************************
C*
C*   ERROR CODES:
C*
C************************
C*
C*   Subroutines called:
C*
C*
C*
C*
C************************
C*
C*   Files used:
C*
C*
C*********************************************************************************
C*
C*
C*

0001          SUBROUTINE GMATBL(HOW,TABLE)
0002          BYTE          TYPE,TTYPE

0003          INTEGER*2     HOW

0004          REAL*4        TABLE(10)

0005          DATA   TYPE/'114/     ,UPPER/100./    ,RLWR/10./

0006          IF(HOW.EQ.0) GO TO 50

0007          TYPE *,'Type of table to build ( D - default,C - tailored ,',
              1                         'S - points user input)'
0008          ACCEPT 20,TTYPE
0009    20    FORMAT(A1)

0010          IF(TTYPE.NE.'C' .AND. TTYPE.NE.'S')GO TO 50

0011          IF(TTYPE.NE.'C')GO TO 200

0012          TYPE *,'Enter upper limit of the data range'
0013          ACCEPT *,UPPER 0014          TYPE *,'Enter lower limit of the data range'
0015          ACCEPT *,RLWR 0016          TYPE *,'Enter N - logarithmic increments ,L - linear increments '
0017          ACCEPT 20,TYPE 0018    50    IF(TYPE .NE. 'N')THEN
0019                    RINC = (UPPER - RLWR) / 9.
0020                    DO 100 M = 1,10
```

```
-0021   100         TABLE(M) = (RLLWR + (M-1) * RINC) * 255./100.
0022          ELSE
0023                RLLWR = ALOG10(RLWR * 255./100.)
0024                RINC = (ALOG10(UPPER * 255./100.) - RLLWR) / 9.
0025                DO 125 M = 1,10
0026   125          TABLE(M) = 10. ** (RLLWR + (M-1) * RINC)
0027          ENDIF

0028          GO TO 300

0029   200    TYPE *,'Enter digital drive values in increasing order '

0030          DO 225 M = 1,10

0031          TYPE 205,M
0032   205    FORMAT(1X,'Enter table element(',I2,') ',$)
0033   225    ACCEPT *,TABLE(M)

0034   300    DO 310 M =1,10
0035   310    TABLE(M) = ANINT(TABLE(M))
0036          RETURN

0037          END
```

PROGRAM SECTIONS

| Number | Name | Size | | Attributes |
|---|---|---|---|---|
| 1 | $CODE1 | 001246 | 339 | RW,I,CON,LCL |
| 2 | $PDATA | 000434 | 142 | RW,D,CON,LCL |
| 3 | $IDATA | 000016 | 7 | RW,D,CON,LCL |
| 4 | $VARS | 000024 | 10 | RW,D,CON,LCL |
| 5 | $TEMPS | 000002 | 1 | RW,D,CON,LCL |

ENTRY POINTS

| Name | Type | Address | Name | Type | Address | Name | Type | Address | Name | Type | Address | Name | Type | Address |
|---|---|---|---|---|---|---|---|---|---|---|---|---|---|---|
| GMATBL | | 1-000000 | | | | | | | | | | | | |

VARIABLES

| Name | Type | Address | Name | Type | Address | Name | Type | Address | Name | Type | Address | Name | Type | Address |
|---|---|---|---|---|---|---|---|---|---|---|---|---|---|---|
| HOW | I*2 | F-000002* | M | I*2 | 4-000016 | RINC | R*4 | 4-000012 | RLLWR | R*4 | 4-000020 | RLWR | R*4 | 4-000006 |
| TTYPE | L*1 | 4-000001 | TYPE | L*1 | 4-000000 | UPPER | R*4 | 4-000002 | | | | | | |

ARRAYS

| Name | Type | Address | Size | Dimensions |
|---|---|---|---|---|
| TABLE | R*4 | F-000004* | 000050 | 20  (10) |

LABELS

| Label | Address | Label | Address | Label | Address | Label | Address | Label | Address |
|---|---|---|---|---|---|---|---|---|---|
| 20' | 2-000000 | 50 | 1-000410 | 100 | ** | 125 | ** | 200 | 1-000754 |
| 205' | 2-000004 | 225 | ** | 300 | 1-001130 | 310 | ** | | |

FUNCTIONS AND SUBROUTINES REFERENCED $ALOG10  $ANINT
Total Space Allocated = 001746   499

Appendix C

```
C*******************************************************************
C*                Copyright © EASTMAN KODAK COMPANY 1986
C*                        ALL RIGHTS RESERVED
C*******************************************************************
C*
C*         Module Name: GMACAL.FTN
C*
C*******************************************************************
C*
C*    Written by: WK Darrow         Date: 10-NOV-86
C*
C*    Modified by:                  Date:
C*
C*    Purpose:
C*           This subroutine regresses theoretical light values to the
C*    light values calculated from data collected
C*
C**************************
C*
C*    Calling sequence: CALL GMACAL(IREP,WAIT,KDATA,DTABLE,LWPSCT,RWPSC,STDEV)
C*
C*
C*    Arguments:
C*
C*    1.IREP   -      B     Indicates whether Full screen or Central
C*                          patch readings were made.('Y' -> Central
C*                          patch readings made)
C*
C*    2.WAIT   -      R     Time between readings(Reading-Delay) measured
C*                          in seconds
C*
C*    3.KDATA  -      I     Number-of-readings made for each patch
C*
C*    4.DTABLE-       R(10) Table of drive values to be used for patch generation
C*                          and regression
C*
C*    5.LWPSCT-       R(10,4) Log of the measured light values
C*
C*    6.RWPSC  -      R(10,4) Measured light values
C*
C*    7.STDEV  -      R(10,4) Standard deviation for the measured light
C*                          values
C*
C**************************
C*
C*    ERROR CODES:
C*
C**************************
C*
C*    Subroutines called:
C*
C*
C*
C*
C**************************
C*
C*    Files used:
C*
C*******************************************************************
C*
C*
C*
0001        SUBROUTINE GMACAL(IREP,WAIT,KDATA,DTABLE,LWPSCT,RWPSC,STDEV)

0002        INTEGER*2 IWORD(3,4),IVDAC(10)
```

```
0003        REAL*4 STDEV(4,10),RWPSC(10,4),LWPSCT(10,4),GAIN,VOFF,TMP
0004        REAL*4 GAMMA(3,4),INTCPT(3,4),NEWSUM(3,3,4),NSUM1,NSUM2,NSUM3
0005        REAL*4 LTHED,LACT,LACC,LTMP(4,10),VINIRE(10),VDIRE(10)
0006        REAL*4 DACR1,TVIN,TDACR1,VDRDAC(10),VDRIRE(10)
0007        REAL*4 TGAMMA(3,4),TINCPT(3,4)
0008        REAL*4 DTABLE(10)

0009        CHARACTER*1 ZANS,YANS,ANS
0010        CHARACTER*3 UNIT,RSTRT
0011        CHARACTER*5 PDG

0012        BYTE ISSAH(79),IREP
0013        BYTE TRSET(7)

0014        LOGICAL*1 AMODE1,AMODE2,INFLT1,INFLT2

0015        DATA IWORD/'WH','IT','E ',' R','ED',' '
           1,'GR','EE','N ',' B','LU','E '/
0016        DATA GAIN,VOFF/1.0,0.0/
0017        DATA LMODE,UNIT/1,'IRE'/
0018        DATA ZANS,YANS/'Y','Y'/
0019        DATA NPRINT/0/
0020        DATA TRSET/'33,'133,'62,'101,'33,'133,'112/
        C
        C.......Allow user to select printed report or not
        C
0021  4990  TYPE 370
0022  370   FORMAT(' Do you want statistics reported on the line
           1printer (Y/N) ? ',$)
0023        ACCEPT 371,ZANS
0024  371   FORMAT(1A)
        C
        C......Open statistics file
        C 0025        OPEN(UNIT=4,NAME='AGAMMA.DAT',STATUS='NEW')
        C
        C........Setup parameters for automated NEWSUM minimization
        C
0026  374   AMODE1 = .FALSE.
0027        AMODE2 = .FALSE.
0028        INFLT1 = .FALSE.
0029        INFLT2 = .FALSE.
        C-----------------
        C........Determine which NEWSUM element to minimize
        C-----------------
        C
        C........Select color element
        C
0030        TYPE 375
0031  375   FORMAT(' Select color for newsum minimization (R,G,B,A) ',$)
0032        ACCEPT 376,ANS
0033  376   FORMAT(A1)
        C
        C........Insure response is acceptable
        C
0034        NCOLOR = INDEX('RGBA',ANS)
0035        IF(NCOLOR.EQ.0)GO TO 374

0036        NAUTO = 0
0037        IF(NCOLOR.EQ.4)THEN
0038             NCOLOR = 1
0039             NAUTO = 1
0040        ENDIF
        C
        C........Setup color loop counter for this color only
        C
```

```
0041            IC1 = NCOLOR + 1
0042            IC4 = NCOLOR + 1
        C
        C.......Select regression curve to difference from.
        C
        C       DG30+ is the regression fit for data from 30-100
        C       DG20+ is the regression fit for data from 20-100
        C       DG10+ is the regression fit for data from 10-100
        C
0043            TYPE 380
0044    380     FORMAT(/' Select %DG (DG30+,DG20+,DG10+) ',$)
0045    379     ACCEPT 381,PDG
0046    381     FORMAT(A5)
        C
        C.......Insure an acceptable response to prompt
        C
0047            NPDG = INDEX('DG30+DG20+DG10+',PDG)
0048            IF(NPDG.EQ.0)GO TO 379
        C
        C.......Setup regession loop counter to calculate the specific regression
        C       requested
        C
0049            NPDG = NPDG/5 + 1
0050            IR1 = NPDG
0051            IR3 = NPDG
        C
        C.......Select start of difference accumulation from selected curve
        C 0052    384     TYPE 385
0053    385     FORMAT(/' Select accumulation start ( 10+,20+,30+ ) ',$)
0054            ACCEPT 386,RSTRT
0055    386     FORMAT(A3)
        C
        C.......Insure a valid response to prompt
        C
0056            NRSTRT = INDEX('10+20+30+',RSTRT)
0057            IF(NRSTRT.EQ.0)GO TO 384
0058            NRSTRT = NRSTRT/3 + 1
        C
        C.......Ask if operator would like autominimization mode
        C
0059            TYPE 390
0060    390     FORMAT(/' Auto minimization mode? ( Y or N) ',$)
0061            ACCEPT 376,ANS
0062            IF(ANS.NE.'Y' .AND. ANS.NE.'y')GO TO 396
        C
        C.......If yes,then initialize parameters necessary for that mode
        C
0063            AMODE1 = .TRUE.
0064            GAIN = 1.
0065            VOFF = 0.
0066            DAHSUM = 0.
0067            NPASS = 0
        C
        C.......Find out which parameter to minimize first
        C
0068    391     TYPE 392
0069    392     FORMAT(/' 1 Minimize Gain then Offset ',
                1      /' 2 Minimize Offset then Gain ',
                2      /' 3 Minimize Offset only ',
                2      /' Choose (1 ,2 or 3 ) ',$)
0070            ACCEPT 376,ANS
        C
        C.......Insure an acceptable answer,then setup mode and inflection point flags to
        C       yield desired sequence of events
        C
```

```
0071            MMODE = INDEX('123',ANS)
0072            IF(MMODE.EQ.0)GO TO 391
0073            AMODE2 = .FALSE.
0074            IF(ANS.EQ.'1')AMODE2 = .TRUE.
0075            IF(ANS.EQ.'3')THEN
0076                    AMODE2 = .TRUE.
0077                    INFLT1 = .TRUE.
0078            ENDIF
        C
        C.......GAMMA MODE SELECTION
        C
0079    396     TYPE 395
0080    395     FORMAT(/' INPUT THE MODE THAT YOU WILL BE USING. '/
                1' 1 = VIP ==) RGB   or  1410 ==) R,G,B'/
                2' 2 = VIP ==) ENCODE ==) NTSC'/
                3' 3 = VIP(single channel) ==) NTSC  or  1410 ==) NTSC')
0081            ACCEPT 397,LMODE
0082    397     FORMAT(I)
        C
        C.......Allow user to select units to be used in the regression
        C
0083            TYPE 818
0084    818     FORMAT(/' INPUT THE UNITS FOR THE REGRESSION. DAC OR IRE.'$)
0085            ACCEPT 819,UNIT
0086    819     FORMAT(A3)
0087    820     ISTAB1=1                        !INITIALIZE STAT STORAGE 0088            TYPE 822
0089    822     FORMAT(' INPUT NAME OF GAMMA STRIP - HEADER (79 CHAR MAX)')
0090            ACCEPT 824,ISSAH
0091    824     FORMAT(79A)
0092    830     WRITE (4,832) ISSAH             !REPORT GAMMA - HEADER FIRST
0093    832     FORMAT('1',1X,79A)
        C...... Select correct title for output on line printer
0094            IF(LMODE.EQ.1)THEN
0095               WRITE(4,8330)
0096    8330    FORMAT(' MODE 1 :: VIP ==) RGB  or  1410 Linearity
                1 (TSG3) ==) RGB ')
0097            ENDIF
0098            IF(LMODE.EQ.2)THEN
0099               WRITE(4,8331)
0100    8331    FORMAT(' MODE 2 :: VIP ==) ENCODE ==) NTSC ; no 1410
                1check possible (714 mv video - no sync)')
0101            ENDIF
0102            IF(LMODE.EQ.3)THEN
0103               WRITE(4,8332)
0104    8332    FORMAT(' MODE 3 :: VIP(green) ==) NTSC (which allows 714
                1 mv video - no sync) or  1410 Linearity (TSG3)
                1 ==) NTSC ')
0105            ENDIF
0106            WRITE(4,8335)KDATA,WAIT
0107    8335    FORMAT(' # READINGS = ',I3,2X,' TIME BETWEEN READINGS (sec)= '
                1 ,F4.0)
        C
0108            IF(LMODE.EQ.3)THEN
0109               WRITE(4,8336)
0110    8336    FORMAT('  VDRDAC =((255 * (VIN - 19.125))/235.875) *
                1GAIN + VOFF',/,' VDRIRE = VDRDAC * 100 / 255 ')
0111            ELSE
0112               WRITE(4,8337)
0113    8337    FORMAT('  VDRDAC = GAIN * VIN + VOFF ',/,
                1 ' VDRIRE = VDRDAC * 100 / 255 ')
0114            ENDIF
        C
0115            IF(IREP.EQ.'Y')THEN
0116               WRITE(4,8329)
0117    8329    FORMAT('  CENTRAL PATCH DISPLAY')
0118            ELSE
```

```
0119            WRITE(4,8329)
0120    8328    FORMAT(' FULL SCREEN DISPLAY ')
0121            ENDIF 0122            write(4,9350)dtable
0123    9350    format(' VIN ',10f11.0)
        C
        C.......Allow user to input GAIN and VOFF values
        C
0124            IF(AMODE1.EQ. .FALSE.)THEN
0125               TYPE 372
0126    372        FORMAT(' Input values for GAIN and VOFF. ',$)
0127               ACCEPT *,GAIN,VOFF
0128            ENDIF
        C
        C.......
        C
0129    4992    IF(NAUTO.NE.0)THEN
0130               NCOLOR = NAUTO
0131               NAUTO =NAUTO + 1
0132               IF(NAUTO.GT.4)GO TO 960
0133               IR1 = NPDG
0134               IR3 = NPDG
0135            ENDIF
        C
        C....... Auto minimization return point for printed output
        C
0136    4995    IF(NAUTO.NE.0)THEN
0137               IC1 = NAUTO
0138               IC4 = NAUTO
0139            ENDIF
        C
        C.......Sum the light and drive values for all 4 colors (RGB and White)
        C
0140    5000    DO 900 IGP=IC1,IC4
0141            IF(NPRINT.EQ.1) WRITE (4,8342) (IWORD(IMN,IGP),IMN=1,3)
0142    8342    FORMAT(' ========) ',3A2,' (========')

0143            IF(NPRINT.EQ.1)WRITE (4,8340),GAIN,VOFF
0144    8340    FORMAT(' GAIN = ',F7.4,4X,' VOFF = ',F9.4)
0145            IG1S = 3 - (IR1 - 1)
0146            IG1D = 8 + (IR1 - 1)
0147            DO 901 I=IR1,IR3
0148            DO 940 IG1 = 1,10
        C#      VIRE=IG1
        C...... CHECK VIP MODE SELECTED BY USER
        C#      VIN = (VIRE * 10.)* (255./100.)      !Convert IRE to DAC units
0149            VIN = DTABLE(IG1)
0150            IF(LMODE.EQ.3)THEN
0151               TDACR1 = (255. * (VIN - 19.125))/235.875
0152            ELSE
0153               TDACR1 = VIN
0154            ENDIF
        C.......Round for the accuracy of the regression to match equiment
0155            DACR1 = (GAIN * TDACR1) + VOFF
0156            VDRDAC(IG1)=ANINT(DACR1)
        C
0157            TVIN = (VDRDAC(IG1) / 255.) * 100.
0158            VDRIRE(IG1) = (ANINT(TVIN*10.))/10.
0159    840     CONTINUE
0160            SWPSC=0.                     !SUM WATT/SQ.CM. (WPSC)
0161            SVDRV=0.                     !SUM VIRE
0162            SVDRVS=0.                    !SUM VIRE SQ.
0163            SWXV=0.                      !SUM WPSC*VIRE
0164            RIG1D=IG1D
0165            IG1E=IG1S+IG1D-1
0166            DO 945 IG1=IG1S,IG1E
```

```
0167            SWPSC=SWPSC+LAPSCT(IG1,IGP)
        C........Use either DAC or IRE values in regression
0168            IF(UNIT.EQ.'DAC')THEN
0169               RLVDRV = ALOG10(VDRDAC(IG1))
0170            ELSE
0171               RLVDRV = ALOG10(VDRIRE(IG1))
0172            ENDIF
        C
0173            SVDRV=SVDRV+RLVDRV
0174            SVDRVS=SVDRVS+RLVDRV*RLVDRV
0175            SWXV=SWXV+LAPSCT(IG1,IGP)*RLVDRV
0176    845     CONTINUE
        C
        C.......Compute the GAMMAS and INTERCEPTS
        C
0177            GAMMA(I,IGP)=(SWXV-SVDRV*SWPSC/RIG1D)/(SVDRVS-SVDRV*SVDRV/RIG1D)
0178            INTCPT(I,IGP)=(SWPSC-GAMMA(I,IGP)*SVDRV)/RIG1D
0179            NSUM1 = 0.
0180            NSUM2 = 0.
0181            NSUM3 = 0.
        C       DO 850 IG2=IG1S,IG1E
0182            DO 850 IG2=1,10
0183            R1=LAPSCT(IG2,IGP)
0184            LACT = 10**R1                    !Light actual
        C
        C.......INTEGERIZE AND TRUNCATE GAMMA , NEWSUM AND INTERCEPT
0185            TGAMMA(I,IGP) = ANINT(GAMMA(I,IGP)*1000.)/1000.
0186            TINCPT(I,IGP) = ANINT(INTCPT(I,IGP)*1000.)/1000.
        C
        C.......Compute theoretical light
        C
0187            IF (UNIT.EQ.'DAC')THEN
0188               LTHEO = (10.**TINCPT(I,IGP)) * (VDRDAC(IG2)**TGAMMA(I,IGP))
0189            ELSE
0190               LTHEO = (10.**TINCPT(I,IGP)) * (VDRIRE(IG2)**TGAMMA(I,IGP))
0191            ENDIF
        C
0192            LACC = ((LTHEO - LACT)/LACT)     ! Light accuracy
0193            LACC = LACC*100.                 ! % Light
0194            LTMP(IGP,IG2) = LACC
0195            NSUM1 = NSUM1 + ABS(LACC)
0196            IF(IG2.GT.1)   NSUM2 = NSUM2 + ABS(LACC)
0197            IF(IG2.GT.2)   NSUM3 = NSUM3 + ABS(LACC)
0198    850     CONTINUE
0199            NEWSUM(1,I,IGP) = ANINT(NSUM1*100.)/100.
0200            NEWSUM(2,I,IGP) = ANINT(NSUM2*100.)/100.
0201            NEWSUM(3,I,IGP) = ANINT(NSUM3*100.)/100.
        C
        C........Skip write to file if no line printer output selected
        C
0202            IF((ZANS.EQ.'N'.OR.ZANS.EQ.'n') .OR. NPRINT .EQ. 0)GO TO 4510
        C
0203            IF(I.NE.1 )GOTO 4500
        C
        C.......Heading output for Line Printer
        C
0204            DO 851 J=1,10
        C       TMP = (J * 10.) * (255./100.)
0205            TMP = DTABLE(J)

0206            IF(LMODE.EQ.3)THEN
0207               DACTMP = (255. * (TMP - 19.125)) / 235.875
0208            ELSE
0209               DACTMP = TMP
0210            ENDIF
        C
0211            DTMP = (GAIN * DACTMP) + VOFF
```

```
0212            IVDAC(J) = ANINT(DTMP)
0213            VINIRE(J) = (IVDAC(J) /255.) * 100.
0214            VDIRE(J) = (ANINT(VINIRE(J)*10.))/10.
0215    551     CONTINUE
        C
0216            IF(INIT.EQ.'DAC')THEN
0217            WRITE(4,852)(IVDAC(K),K=1,10)
0218    852     FORMAT(' *VORDAC',5X,I4,9(7X,I4))
0219            WRITE(4,853)(VDIRE(K),K=1,10)
0220    853     FORMAT('  VDRIRE ',3X,F6.1,9(5X,F6.1))
0221            ELSE
0222            WRITE(4,854)(IVDAC(K),K=1,10)
0223    854     FORMAT(' VORDAC',5X,I4,9(7X,I4))
0224            WRITE(4,856)(VDIRE(K),K=1,10)
0225    856     FORMAT(' *VDRIRE ',3X,F6.1,9(5X,F6.1))
0226            ENDIF
        C
        C........Data output for the regression
        C
0227            IF (KDATA.GT.1)then
0228                    WRITE(4,899),(STDEV(IGP,NM)*1000.,NM=1,10)
0229    899     FORMAT(' V*1K ',10F11.5)
0230                    WRITE(4,898)((SQRT(STDEV(IGP,NM))/RWPSC(NM,IGP))*100.,NM = 1,10)
0231    898     FORMAT('   CV ',10F11.2)
0232            ENDIF
        C
0233                 WRITE (4,934) RWPSC(1,IGP),RWPSC(2,IGP),RWPSC(3,IGP),
                1RWPSC(4,IGP),RWPSC(5,IGP),RWPSC(6,IGP),
                2RWPSC(7,IGP),RWPSC(8,IGP),RWPSC(9,IGP),
                3RWPSC(10,IGP)
0234    934     FORMAT(' *LACT ',10F11.3)

0235    4500    IF(NPRINT.EQ.1)WRITE(4,936)4-I,(LTMP(IGP,MN),MN = 1,10)
0236    936     FORMAT(' %DG',I1,'+   ',10(F8.2,3X))
0237    4510    IG1S=IG1S-1
0238            IG1D=IG1D+1
0239    901     CONTINUE
        dC
0240    900     CONTINUE              ! LOOP TO FILL GAMMA .... ARRAY
        C
0241            TYPE 81, (IWORD(IMN,NCOLOR+1),IMN=1,3),GAIN,VOFF,TGAMMA(NPOS,NCOLOR+1),
                1                       NEWSUM( NRSTRT ,NPOS ,NCOLOR+1)
0242    81      FORMAT('+',3A2,' Current Gain = ',F5.2,' Offset ',F3.0
                1       ' Gamma ',F5.3,' Active NEWSUM = ',F7.3)

0243            IF(NPRINT.EQ.1)GO TO 583
        C
        C.......Allow user to input GAIN and VOFF values
        C
0244            IF (AMODE1.EQ. .FALSE.)THEN
0245                    TYPE 372
0246                    TYPE 373
0247    373             FORMAT('+ (0,0 Ends this mode) ',$)
0248                    ACCEPT *,AGAIN,AVOFF
0249                    IF(AGAIN.NE.0.)THEN
0250                            GAIN = AGAIN
0251                            VOFF = AVOFF
0252                            GO TO 5000
0253                    ENDIF
0254            ELSE
        C
        C.......Auto mode
        C
        C               IF(INFLT2 .EQ. .TRUE.) GO TO 583
0255                    IF(INFLT2 .EQ. .TRUE.) GO TO 555
0256                    NPASS = NPASS + 1
```

```
C
C....... 1st pass is to establish a base point for newsum and to set
      C       increment for the appropriate mode.
      C
0257                  IF( NPASS .EQ. 1) THEN
0258                          PWSUM = NEWSUM( NRSTRT ,NPDG ,NCOLOR+1)
0259                          IF( AMODE2 .XOR. INFLT1) THEN
0260                                  DEL = .05
0261                                  GAIN = GAIN + DEL
0262                                  GAIN = ANINT(GAIN *100)/100.
0263                          ELSE
0264                                  DEL = 1.0
0265                                  VOFF = VOFF + DEL
0266                                  VOFF = ANINT(VOFF)
0267                          ENDIF
0268                  ENDIF
C
C......... 2nd pass is to establish the direction to seek the minimum.
C          If the difference between two successive newsums are less than
C          or equal to the requested delta another pass is made in the same
C          direction without updating the previous newsum until a proper
C          direction is established
C
0269                  IF( NPASS .EQ. 2) THEN
0270                          IF(DLNWSM(PWSUM,NEWSUM(NRSTRT,NPDG,NCOLOR+1)).LT.DNWSUM)NPASS = 1
0271                          IF (PWSUM .LT. NEWSUM( NRSTRT ,NPDG ,NCOLOR+1) .AND.
     1                            DLNWSM(PWSUM,NEWSUM(NRSTRT,NPDG,NCOLOR+1)).GT.DNWSUM) THEN
0272                                  DEL = - DEL
0273                                  IF( AMODE2 .XOR. INFLT1) THEN
0274                                          GAIN = GAIN + 2. * DEL
0275                                          GAIN = ANINT(GAIN *100)/100.
0276                                  ELSE
0277                                          VOFF = VOFF + 2. * DEL
0278                                          VOFF = ANINT(VOFF)
0279                                  ENDIF
0280                          ELSE
0281                                  IF(NPASS.GT.1)PWSUM = NEWSUM( NRSTRT ,NPDG ,NCOLOR+1)
0282                                  IF( AMODE2 .XOR. INFLT1) THEN
0283                                          GAIN = GAIN + DEL
0284                                          GAIN = ANINT(GAIN *100)/100.
0285                                  ELSE
0286                                          VOFF = VOFF + DEL
0287                                          VOFF = ANINT(VOFF)
0288                                  ENDIF
0289                          ENDIF
0290                  ENDIF
C
C......... 3 rd and greater passes check that the newsum continues in the
C          same direction and that the difference between the two is greater
C          than the requested delta. When this does not occur the previous
C          point was a minimum and we are done.
C             A word of caution here. If the newsum function is pretty flat
C          and the delta if not small this algorithm will never terminate as
C          the point to point variation will not be greater than the delta
C
0291                  IF(NPASS.GT.2)THEN
0292                          IF( PWSUM .LT. NEWSUM( NRSTRT ,NPDG ,NCOLOR+1) .AND.
     1                            DLNWSM(PWSUM,NEWSUM(NRSTRT,NPDG,NCOLOR+1)).GT.DNWSUM) THEN
0293                                  IF(INFLT1)INFLT2 = .TRUE.
0294                                  NPASS = 0
0295                                  IF( AMODE2 .XOR. INFLT1) THEN
0296                                          GAIN = GAIN - DEL
0297                                          GAIN = ANINT(GAIN *100)/100.
0298                                  ELSE
0299                                          VOFF = VOFF -DEL
0300                                          VOFF = ANINT(VOFF)
0301                                  ENDIF
```

```
0302                              INFLT1 = .TRUE.
        C                         IF(INFLT2) GO TO 555
0303                   ELSE
0304                              PNWSUM = NEWSUM( NRSTRT ,NPDG ,NCOLOR+1)
0305                              IF( AMODE2 .XOR. INFLT1) THEN
0306                                      GAIN = GAIN + DEL
0307                                      GAIN = ANINT(GAIN *100)/100.
0308                              ELSE
0309                                      VOFF = VOFF + DEL
0310                                      VOFF = ANINT(VOFF)
0311                              ENDIF
0312                    ENDIF
0313                ENDIF
0314             GO TO 5000
0315        ENDIF

C
        C...... Reached a minimum. list gain, offset and minimum newsum then ask
        C       if the operator wants to check another region of gain and offset 0316    555  IF(AMODE1.AND. NAUTO.EQ.0)THEN
0317              TYPE 560
0318    560       FORMAT(' Check another region for MIN ( Y or N ) ',$)
0319              ACCEPT 376,ANS C
        C........ If yes,then get a new seed value for gain and offset.Also get
        C         a new value for allowable point to point variation
        C
0320              IF(ANS.EQ.'Y' .OR. ANS .EQ. 'y')THEN
0321                  TYPE 565
0322    565           FORMAT(' Enter initial gain,offset and delta ',$)
0323                  ACCEPT *,GAIN,VOFF,DNWSUM
0324                  GAIN = ANINT(GAIN *100)/100.
0325                  VOFF = ANINT(VOFF)
0326                  IF(DNWSUM.GT. 0.5) DNWSUM = 0.5
0327                  IF(MMODE.LT.3)INFLT1 = .FALSE.
0328                  INFLT2 = .FALSE.
0329                  NPASS = 0
0330                  TYPE 570,TRSET
0331    570           FORMAT(' ',7A1)
0332                  GO TO 4995
0333              ENDIF
0334        ENDIF
0335        IF(NPRINT.EQ.0)TYPE *,' '
0336    580 IF((ZANS.EQ.'Y'.OR.ZANS.EQ.'y') .AND. NPRINT .EQ. 0)THEN
0337              IC1 = 1
0338              IC4 = 4
0339              IR1 = 1
0340              IR3 = 3
0341              NPRINT = 1
0342              GO TO 4995
0343        ENDIF
        C
        C........Print the gammas,intercepts and newsums
        C
0344    583 IF(NAUTO.GT.0)THEN
0345              INFLT1 = .FALSE.
0346              INFLT2 = .FALSE.
0347              GAIN = 1.
0348              VOFF = 0.
0349              NPASS = 0
0350              NPRINT = 0
0351              IF(MMODE.EQ.3)INFLT1 = .TRUE.
0352              GO TO 4992
0353        ENDIF
0354    860 WRITE(4,584)
0355    584 FORMAT(T5,100('='))
```

```
0356            WRITE(4,585)
0357    585     FORMAT(/,T15,' GAMMA 3+',T30,' INTERCEPT 3+',
               1       T47,' GAMMA 2+',T62,' INTERCEPT 2+',
               2       T80,' GAMMA 1+',T96,' INTERCEPT 1+')
0358            DO 1779 J=1,4
0359            WRITE (4,855)(IWORD(IMN,J),IMN=1,3),TGAMMA(1,J),TINCPT(1,J),
               1       TGAMMA(2,J),TINCPT(2,J),TGAMMA(3,J),TINCPT(3,J)
0360    855     FORMAT(' ',3A2,T17,F6.3,T33,F6.3,T49,F6.3,T65,F6.3,T83,F6.3,
               1T99,F6.3)
0361    1779    CONTINUE

0362            WRITE(4,586)
0363    586     FORMAT(//,1X,T15,'NEW SUM PERCENT TABLE - EQUALS ACCUMULATED % '
               1 'DIFFERENCE PER GAMMA AND VDR VALUE ',/)
0364            WRITE(4,587)
0365    587     FORMAT(1X,'%DGn+'T24,'%DG3+',T56,'%DG2+',T88,'%DG1+')
0366            WRITE(4,588)
0367    588     FORMAT(1X,'m+',T16,'1+',T26,'2+',T36,'3+',T48,'1+',T58,'2+',
               1 T68,'3+',T80,'1+',T90,'2+',T100,'3+')
0368            WRITE(4,589)
0369    589     FORMAT(1X,T13,3('--------------------------',2X))

0370            DO 1790 J = 1,4

0371    1790    WRITE(4,590)(IWORD(IMN,J),IMN=1,3),((NEWSUM(MN,JJ,J),MN =1,3),
               1 JJ = 1,3)
0372    590     FORMAT(' '3A2,T9,3(2X,3(2X,F7.2)))

0373            WRITE(4,1780)
0374    1780    FORMAT(' NOTE : * Indicates that these values are actually
                lused for the regression analysis. ')
0375            WRITE (4,*) '%DGn+ means percent difference of calculated light ',
               1           '( per gamma as derived from regression of n to ',
               2           '100 IRE)'
0376            WRITE(4,*) '                to actual light measured'
0377            WRITE(4,*) '%DGn+ uses full internal precision,ALL others rounded',
               1       ' and truncated as shown '
0378            WRITE(4,*) 'm+ means accumulation of %DGn+ values from n to 100 ',
               1           ' IRE drive '
        C
        C......Close temporary file and print it
        C
        C.......Top of form feed
0379            WRITE(4,837)
0380    837     FORMAT('1')

0381            IF(ZANS.EQ.'Y'.OR.ZANS.EQ.'y')THEN
0382              CLOSE(UNIT=4,DISPOSE='PRINT')
0383            ELSE
0384              CLOSE(UNIT=4,DISPOSE='DELETE')
0385            ENDIF
0386            NPRINT = 0
        C
        C........Check if another color is to be calculated
        C
0387            TYPE 906
0388    906     FORMAT('+','
               1 '                        ')
0389            TYPE 907
0390    907     FORMAT('+Do you want to optimize another color (Y/N) ',$)
0391            ACCEPT 908,YANS
0392    908     FORMAT(A1)
0393            IF(YANS.EQ.'Y'.OR.YANS.EQ.'y')GOTO 4990
        C
0394    910     RETURN
0395            END
```

PROGRAM SECTIONS

| Number | Name | Size | | Attributes |
|---|---|---|---|---|
| 1 | $CODE1 | 013606 | 3011 | RW,I,CON,LCL |
| 2 | $PDATA | 005310 | 1380 | RW,D,CON,LCL |
| 3 | $IDATA | 000102 | 33 | RW,D,CON,LCL |
| 4 | $VARS | 001704 | 482 | RW,D,CON,LCL |
| 5 | $TEMPS | 000010 | 4 | RW,D,CON,LCL |

ENTRY POINTS

| Name | Type | Address | Name | Type | Address | Name | Type | Address | Name | Type | Address | Name | Type | Address |
|---|---|---|---|---|---|---|---|---|---|---|---|---|---|---|
| SMACAL | | 1-000000 | | | | | | | | | | | | |

VARIABLES

| Name | Type | Address | Name | Type | Address | Name | Type | Address | Name | Type | Address | Name | Type | Address |
|---|---|---|---|---|---|---|---|---|---|---|---|---|---|---|
| AGAIN | R*4 | 4-001652 | AMODE1 | L*1 | 4-001520 | AMODE2 | L*1 | 4-001521 | ANS | CHR | 4-001356 | AVOFF | R*4 | 4-001666 |
| DACR1 | R*4 | 4-001060 | DACTMP | R*4 | 4-001644 | DEL | R*4 | 4-001676 | DNWSUM | R*4 | 4-001550 | DTMP | R*4 | 4-001650 |
| GAIN | R*4 | 4-000054 | I | I*2 | 4-001572 | IC1 | I*2 | 4-001534 | IC4 | I*2 | 4-001536 | IGP | I*2 | 4-001562 |
| IG1 | I*2 | 4-001574 | IG1D | I*2 | 4-001570 | IG1E | I*2 | 4-001626 | IG1S | I*2 | 4-001566 | I32 | I*2 | 4-001634 |
| IHN | I*2 | 4-001564 | INFLT1 | L*1 | 4-001522 | INFLT2 | L*1 | 4-001523 | IREP | L*1 | F-000002* | IR1 | I*2 | 4-001542 |
| IR3 | I*2 | 4-001544 | ISTAB1 | I*2 | 4-001560 | J | I*2 | 4-001642 | JJ | I*2 | 4-001702 | K | I*2 | 4-001654 |
| KDATA | I*2 | F-000006* | LACC | R*4 | 4-000474 | LACT | R*4 | 4-000470 | LMODE | I*2 | 4-001524 | LTHEO | R*4 | 4-000464 |
| MMODE | I*2 | 4-001556 | MN | I*2 | 4-001560 | NAUTO | I*2 | 4-001532 | NCOLOR | I*2 | 4-001530 | NM | I*2 | 4-001656 |
| NPASS | I*2 | 4-001554 | NPDG | I*2 | 4-001540 | NPRINT | I*2 | 4-001526 | NRSTRT | I*2 | 4-001546 | NSUM1 | R*4 | 4-001450 |
| NSUM2 | R*4 | 4-000454 | NSUM3 | R*4 | 4-000460 | PDG | CHR | 4-001365 | PNWSUM | R*4 | 4-001672 | RIG1D | R*4 | 4-001622 |
| RLVDRV | R*4 | 4-001630 | RSTRT | CHR | 4-001362 | R1 | R*4 | 4-001636 | SVDRV | R*4 | 4-001606 | SVDRVS | R*4 | 4-001612 |
| SWPSC | R*4 | 4-001602 | SXXV | R*4 | 4-001616 | TDACR1 | R*4 | 4-001070 | TMP | R*4 | 4-000064 | TVIN | R*4 | 4-001064 |
| UNIT | CHR | 4-001357 | VIN | R*4 | 4-001576 | VOFF | R*4 | 4-000060 | WAIT | R*4 | F-000004* | YANS | CHR | 4-001355 |
| ZANS | CHR | 4-001354 | | | | | | | | | | | | |

ARRAYS

| Name | Type | Address | Size | Dimensions |
|---|---|---|---|---|
| DTABLE | R*4 | F-000010* | 000050 | 20 (10) |
| GAMMA | R*4 | 4-000070 | 000060 | 24 (3,4) |
| INTCPT | R*4 | 4-000150 | 000060 | 24 (3,4) |
| ISSAH | L*1 | 4-001372 | 000117 | 40 (79) |
| IVDAC | I*2 | 4-000030 | 000024 | 10 (10) |
| IWORD | I*2 | 4-000000 | 000030 | 12 (3,4) |
| LTMP | R*4 | 4-000500 | 000240 | 80 (4,10) |
| LWPSCT | R*4 | F-000012* | 000240 | 80 (10,4) |
| NEWSUM | R*4 | 4-000230 | 000220 | 72 (3,3,4) |
| RWPSC | R*4 | F-000014* | 000240 | 90 (10,4) |
| STDEV | R*4 | F-000016* | 000240 | 90 (4,10) |
| TGAMMA | R*4 | 4-001214 | 000060 | 24 (3,4) |
| TINCPT | R*4 | 4-001274 | 000060 | 24 (3,4) |
| TRSET | L*1 | 4-001511 | 000007 | 4 (7) |
| VDIRE | R*4 | 4-001010 | 000050 | 20 (10) |
| VORDAC | R*4 | 4-001074 | 000050 | 20 (10) |
| VORIRE | R*4 | 4-001144 | 000050 | 20 (10) |
| VINIRE | R*4 | 4-000740 | 000050 | 20 (10) |

LABELS

| Label | Address | Label | Address | Label | Address | Label | Address | Label | Address |
|---|---|---|---|---|---|---|---|---|---|
| 81' | 2-002726 | 370' | 2-000000 | 371' | 2-000102 | 372' | 2-002312 | 373' | 2-003040 |

| | | | | | | | | | |
|---|---|---|---|---|---|---|---|---|---|
| 374 | 1-000220 | 375' | 2-000104 | 376' | 2-000170 | 379 | 1-000442 | 380' | 2-000174 |
| 381' | 2-000242 | 384 | 1-000560 | 385' | 2-000246 | 386' | 2-000326 | 390' | 2-000332 |
| 391 | 1-001036 | 392' | 2-000492 | 395' | 2-000570 | 396 | 1-001220 | 397' | 2-001042 |
| 555 | 1-011350 | 560' | 2-003074 | 565' | 2-003152 | 570' | 2-003224 | 580 | ** |
| 583 | 1-012154 | 584' | 2-003232 | 585' | 2-003244 | 586' | 2-003444 | 587' | 2-003600 |
| 588' | 2-003646 | 589' | 2-003744 | 590' | 2-004020 | 818' | 2-001044 | 819' | 2-001132 |
| 820 | ** | 822' | 2-001136 | 824' | 2-001222 | 830 | ** | 832' | 2-001226 |
| 834' | 2-002656 | 836' | 2-002674 | 837' | 2-004200 | 840 | ** | 845 | ** |
| 850 | ** | 851 | ** | 852' | 2-002456 | 853' | 2-002506 | 854' | 2-002540 |
| 855' | 2-003400 | 856' | 2-002570 | 860 | 1-012256 | 898' | 2-002640 | 899' | 2-002622 |
| 900 | ** | 901 | ** | 906' | 2-004204 | 907' | 2-004330 | 908' | 2-004412 |
| 910 | ** | 1779 | ** | 1790' | 2-004046 | 1730 | ** | 4500 | 1-006516 |
| 4510 | 1-006642 | 4990 | 1-000122 | 4992 | 1-002140 | 4995 | 1-002216 | 5000 | 1-002246 |
| 8328' | 2-002242 | 8329' | 2-002210 | 8330' | 2-001236 | 8331' | 2-001340 | 8332' | 2-001476 |
| 8335' | 2-001660 | 8336' | 2-001752 | 8337' | 2-002106 | 8340' | 2-002420 | 8342' | 2-002360 |
| 8350' | 2-002274 | | | | | | | | |

FUNCTIONS AND SUBROUTINES REFERENCED

CLOS$  DLWSM  OPEN$  $ALG10  $ANINT  $INDEX  $SQRT

Total Space Allocated = 023134    4910

```
        C
        C........This function calculates the absolute difference between two numbers
        C
0001        REAL FUNCTION DLWSM(PWSUM,NEWSUM)
0002        REAL*4 PWSUM,NEWSUM

0003        DLWSM = ABS(PWSUM-NEWSUM)

0004        RETURN

0005        END
```

PROGRAM SECTIONS

| Number | Name | Size | | Attributes |
|---|---|---|---|---|
| 1 | $CODE1 | 000046 | 19 | RW,I,CON,LCL |
| 3 | $IDATA | 000004 | 2 | RW,D,CON,LCL |

ENTRY POINTS

| Name | Type | Address | Name | Type | Address | Name | Type | Address | Name | Type | Address | Name | Type | Address |
|---|---|---|---|---|---|---|---|---|---|---|---|---|---|---|
| DLWSM | R*4 | 1-000000 | | | | | | | | | | | | |

VARIABLES

| Name | Type | Address | Name | Type | Address | Name | Type | Address | Name | Type | Address | Name | Type | Address |
|---|---|---|---|---|---|---|---|---|---|---|---|---|---|---|
| NEWSUM | R*4 | F-000004* | PWSUM | R*4 | F-000002* | | | | | | | | | |

Total Space Allocated = 000052    21

GMACAL.PAT;2            /F77/OP/TR:BLOCKS

Appendix D

```
)RUN [100,122]TMGMA
Process a new or old DATA set ( N or O) O
 Enter old DATAset name (6 characters max)
T1124A Data set desciptor:

T1124A 69C#206 MIN#3995@H1
Do you want statistics reported on the line printer (Y/N) ? Y
Select color for newsum minimization (R,G,B,A) A Select %DG (DG30+,DG20+,DG10+) DG20+

Select accumulation start ( 10+,20+,30+ ) 20+

Auto minimization mode? ( Y or N) Y

1 Minimize Gain then Offset
2 Minimize Offset then Gain
3 Minimize Offset only
Choose (1 ,2 or 3 ) 3

INPUT THE MODE THAT YOU WILL BE USING.
1 = VIP ==) RGB  or  1410 ==) R,G,B
2 = VIP ==) ENCODE ==) NTSC
3 = VIP(single channel) ==) NTSC  or  1410 ==) NTSC
1

INPUT THE UNITS FOR THE REGRESSION. DAC OR IRE. DAC
INPUT NAME OF GAMMA STRIP - HEADER (79 CHAR MAX)
 RED   Current Gain =  1.00 Offset 14. Gamma 2.425 Active NEWSUM =  1.540
GREEN  Current Gain =  1.00 Offset  4. Gamma 2.291 Active NEWSUM =  3.590
 BLUE  Current Gain =  1.00 Offset  9. Gamma 2.386 Active NEWSUM =  1.320
Do you want to optimize another color (Y/N) N
TT11 -- STOP

)
)
)
)
)
)
)
)
)
```

Appendix E

```
20,20 OPTIMIZATION
MODE 1 :: VIP ==> RGB or 1410 Linearity (TSG3) ==> RGB
# READINGS = 10   TIME BETWEEN READINGS (sec)= 2.
VDRDAC = GAIN * VIN + VOFF
VDRIRE = VDRDAC * 100 / 255
CENTRAL PATCH DISPLAY
```

| VIN | 26. | 51. | 77. | 102. | 128. | 153. | 179. | 204. | 230. | 255. |
|---|---|---|---|---|---|---|---|---|---|---|
| =====> RED <===== | | | | | | | | | | |
| GAIN = 1.0000  VOFF = 14.0000 | | | | | | | | | | |
| *VDRDAC | 40 | 65 | 91 | 116 | 142 | 167 | 193 | 218 | 244 | 269 |
| VDRIRE | 15.7 | 25.5 | 35.7 | 45.5 | 55.7 | 65.5 | 75.7 | 85.5 | 95.7 | 105.5 |
| V*1K | 0.00000 | 0.00000 | 1.00000 | 2.70000 | 1.80000 | 0.00000 | 2.70000 | 1.00000 | 5.40000 | 0.00000 |
| CV | 0.00 | 0.00 | 0.44 | 0.48 | 0.20 | 0.00 | 0.12 | 0.05 | 0.09 | 0.00 |
| *LACT | 0.900 | 3.200 | 7.210 | 13.060 | 21.220 | 31.500 | 44.760 | 60.190 | 79.210 | 100.000 |
| %DG3+ | 8.98 | -0.46 | -0.07 | -0.59 | -0.07 | -0.23 | -0.26 | -0.33 | -0.45 | -0.10 |
| %DG2+ | 9.33 | -0.19 | 0.17 | -0.38 | 0.13 | -0.05 | -0.10 | -0.18 | -0.31 | 0.03 |
| %DG1+ | 4.48 | -3.13 | -1.73 | -1.50 | -0.36 | -0.02 | 0.40 | 0.71 | 0.93 | 1.50 |
| =====> GREEN <===== | | | | | | | | | | |
| GAIN = 1.0000  VOFF = 4.0000 | | | | | | | | | | |
| *VDRDAC | 30 | 55 | 81 | 106 | 132 | 157 | 183 | 208 | 234 | 259 |
| VDRIRE | 11.8 | 21.6 | 31.8 | 41.6 | 51.8 | 61.6 | 71.8 | 81.6 | 91.8 | 101.6 |
| V*1K | 0.00000 | 0.00000 | 1.00000 | 1.00000 | 2.70000 | 2.30000 | 0.00000 | 0.00000 | 0.00000 | 0.00000 |
| CV | 0.00 | 0.00 | 0.45 | 0.24 | 0.24 | 0.15 | 0.00 | 0.00 | 0.00 | 0.00 |
| *LACT | 0.900 | 2.900 | 7.010 | 13.010 | 21.660 | 32.170 | 45.950 | 61.390 | 80.100 | 100.000 |
| %DG3+ | -9.64 | -0.05 | 0.37 | 0.16 | -0.56 | -0.38 | -0.59 | -0.41 | -0.17 | 0.09 |
| %DG2+ | -9.64 | -0.05 | 0.37 | 0.16 | -0.56 | -0.38 | -0.59 | -0.41 | -0.17 | 0.09 |
| %DG1+ | -4.34 | 3.77 | 2.93 | 1.83 | 0.49 | 0.02 | -0.69 | -0.91 | -1.05 | -0.21 |
| =====> BLUE <===== | | | | | | | | | | |
| GAIN = 1.0000  VOFF = 9.0000 | | | | | | | | | | |
| *VDRDAC | 35 | 60 | 86 | 111 | 137 | 162 | 188 | 213 | 239 | 264 |
| VDRIRE | 13.7 | 23.5 | 33.7 | 43.5 | 53.7 | 63.5 | 73.7 | 83.5 | 93.7 | 103.5 |
| V*1K | 2.70000 | 2.90000 | 1.00000 | 1.80000 | 2.30000 | 0.00000 | 2.90000 | 1.00000 | 0.00000 | 0.00000 |
| CV | 6.04 | 1.79 | 0.45 | 0.33 | 0.23 | 0.00 | 0.12 | 0.05 | 0.00 | 0.00 |
| *LACT | 0.860 | 2.950 | 6.990 | 12.820 | 21.170 | 31.600 | 45.150 | 60.710 | 80.100 | 101.000 |
| %DG3+ | -4.82 | 0.30 | -0.15 | 0.04 | 0.05 | -0.05 | -0.25 | -0.09 | -0.25 | 0.13 |
| %DG2+ | -5.02 | 0.29 | -0.18 | 0.06 | 0.11 | 0.05 | -0.12 | 0.06 | -0.18 | 0.37 |
| %DG1+ | -2.53 | 1.82 | 0.79 | 0.56 | 0.24 | -0.13 | -0.56 | -0.61 | -1.05 | -0.59 |

| | GAMMA 3+ | INTERCEPT 3+ | GAMMA 2+ | INTERCEPT 2+ | GAMMA 1+ | INTERCEPT 1+ |
|---|---|---|---|---|---|---|
| WHITE | 0.000 | 0.000 | 0.000 | 0.000 | 0.000 | 0.000 |
| RED | 2.426 | -3.895 | 2.425 | -3.892 | 2.457 | -3.963 |
| GREEN | 2.291 | -3.525 | 2.291 | -3.525 | 2.259 | -3.453 |
| BLUE | 2.384 | -3.768 | 2.386 | -3.772 | 2.368 | -3.733 |

NEW SUM PERCENT TABLE - EQUALS ACCUMULATED % DIFFERENCE PER GAMMA AND VDR VALUE

| %DGn+ | %DG3+ | | | %DG2+ | | | %DG1+ | | |
|---|---|---|---|---|---|---|---|---|---|
| m+ | 1+ | 2+ | 3+ | 1+ | 2+ | 3+ | 1+ | 2+ | 3+ |
| WHITE | 0.00 | 0.00 | 0.00 | 0.00 | 0.00 | 0.00 | 0.00 | 0.00 | 0.00 |
| RED | 11.54 | 2.56 | 2.09 | 10.87 | 1.54 | 1.34 | 14.86 | 10.39 | 7.25 |
| GREEN | 13.23 | 3.59 | 3.54 | 13.23 | 3.59 | 3.54 | 16.25 | 11.91 | 8.13 |
| BLUE | 6.27 | 1.45 | 1.15 | 6.34 | 1.32 | 1.13 | 8.99 | 6.44 | 4.62 |

NOTE : * Indicates that these values are actually used for the regression analysis.
%DGn+ means percent difference of calculated light
( per gamma as derived from regression of n to 100 IRE)
          to actual light measured
%DGn+ uses full internal precision, ALL others rounded and truncated as shown
m+ means accumulation of %DGm+ values from m to 100 IRE drive

We claim:
1. A method for determining the light output from a cathode ray tube device comprising the steps of:
   (a) positioning a light sensor to receive the light output from the cathode ray tube as a function of differing valued input signals driving the device;
   (b) forming a light table of light measurement values for each value of each input signal;
   (c) determining the optimum values of K, G, O and $\gamma$ utilizing a predicted light equation,

$$L = K(GS+O)^\gamma$$

by using the sum of the percent differences between the light measurement values and the predicted light values, where:
   L = predicted phosphor-light output
   K = a constant which converts a specific unit of signal into a specific unit of light
   S = input signal to the device
   G = device gain
   O = device offset, and
   $\gamma$ = an exponential relationship between a CRT's drive signal and its light output.

2. A method for determining the light output from a cathode ray tube as a function of the input signal driving the device comprising the steps of:
   (a) rigidly positioning a light meter's sensor to receive the light output of the cathode ray tube and to provide an output signal having a value corresponding to the received light;
   (b) setting the input signal to a series of discrete values;
   (c) at each discrete signal input value, form an entry in a light table for each corresponding value of the light sensor output signal;
   (d) forming a sum of a percent difference from the measured light and the predicted light to establish an error value;
   (e) determining the preferred values of K, G, O and $\gamma$ based on the equation:
   $$L = K(GS+O)^\gamma$$
   where:
   L = predicted phosphor-light output
   K = a constant
   S = input signal to the device
   G = device gain
   O = device offset and
   $\gamma$ = an exponential relationship between a CRT's drive signal and its light output, by:
      (a) an automatic minimization process selecting one of the following:
         (i) minimization of the said error value by adjusting the said G term and then the said O term
         (ii) minimization of the said error value by adjusting the said O term and then the said G term
         (iii) minimization of the said error value by holding the said G term at a constant and adjusting the said O term
      (b) a manual minimization process; and
   (h) using the light table values and the preferred values of step (e) to predict the light output from a cathode ray tube for selected discrete values of the input signal.

3. A system for determining the light output from a cathode ray tube device comprising:
   a cathode ray tube device having an input for receiving an input signal and an output for providing light as a function of the input signal;
   a light sensor rigidly linked to said cathode ray tube device for receiving the light therefrom and for transforming the received light to electrical signals;
   a signal generator having its output connected to the input of said cathode ray tube device, which signal generator is responsive to various levels of its own input for generating said input signal to said cathode ray tube device; and
   computer means having table formation capabilities, for receiving as an input the electrical signals from said light sensor, for directing as an input to said signal generator, formed table values which consist of the light values corresponding to the received electrical signals and the various levels of the input to said signal generator; and for forming a characteristic equation of the type $L = K(GS+O)^\gamma$ from the values stored in said table; where:
   L = predicted phosphor-light output
   K = a constant
   S = input signal to the device
   G = device gain
   O = device offset and
   $\gamma$ = an exponential relationship between a CRT's drive signal and its light output, 4. A system for determining the light output from a cathode ray tube device comprising:
   a first CRT monitor device response to RGB input signals;
   a second CRT monitor device responsive to standard encoded input signals;
   a light sensor for repeated optical coupling to said first and said second monitor devices;
   a computer means for running a two-stage program;
   a host signal generator compatible with said first monitor device;
   a standard signal generator compatible with said second monitor device;
   a standard encoder means compatible with said second monitor device;
   a first switch means having a first and a second switch position for connecting the output of said standard signal generator and the host signal generator, respectively, to the inputs of said first monitor device and said standard encoder means;
   a second switch means having a first and a second switch position for connecting said signal path of said first switch and said standard encoder means, respectively, to the input of said second monitor device;
   an output device coupled to said computer means; and
   whereby said computer means operates to provide requested signal levels to the standard or the host signal generators for the purpose of forming a table of light values received from said light sensor and said requested signal levels; and for generating a characteristic equation which predicts the light from the CRT of the monitor device as a function of input signals to the device.

* * * * *